US012648566B2

(12) United States Patent
Doshi et al.

(10) Patent No.: US 12,648,566 B2
(45) Date of Patent: Jun. 9, 2026

(54) SOLID BIO-PESTICIDAL COMPOSITION COMPRISING OF ELEMENTAL SULPHUR AND AZADIRACHTIN

(71) Applicants: Hiteshkumar Anilkant Doshi, Thane (IN); Ramdas Menon Kunjukrishna Puthenveetil, Mumbai (IN)

(72) Inventors: Hiteshkumar Anilkant Doshi, Thane (IN); Ramdas Menon Kunjukrishna Puthenveetil, Mumbai (IN)

(73) Assignee: SML LIMITED, Mumbai (IN)

( * ) Notice: Subject to any disclaimer, the term of this patent is extended or adjusted under 35 U.S.C. 154(b) by 0 days.

(21) Appl. No.: 18/259,035

(22) PCT Filed: Jun. 29, 2022

(86) PCT No.: PCT/IB2022/056065
§ 371 (c)(1),
(2) Date: Jun. 22, 2023

(87) PCT Pub. No.: WO2023/275789
PCT Pub. Date: Jan. 5, 2023

(65) Prior Publication Data
US 2024/0049715 A1     Feb. 15, 2024

(30) Foreign Application Priority Data

Jun. 29, 2021    (IN) .............................. 202121029049

(51) Int. Cl.
| | |
|---|---|
| *A01N 59/02* | (2006.01) |
| *A01N 25/12* | (2006.01) |
| *A01N 43/16* | (2006.01) |
| *A01P 3/00* | (2006.01) |
| *A01P 7/02* | (2006.01) |
| *A01P 7/04* | (2006.01) |

(52) U.S. Cl.
CPC .............. *A01N 59/02* (2013.01); *A01N 25/12* (2013.01); *A01N 43/16* (2013.01); *A01P 3/00* (2021.08); *A01P 7/02* (2021.08); *A01P 7/04* (2021.08)

(58) Field of Classification Search
CPC ........ A01N 59/02; A01N 25/12; A01N 43/16; A01P 3/00; A01P 7/03; A01P 7/04
See application file for complete search history.

(56) References Cited

FOREIGN PATENT DOCUMENTS

| | | | | |
|---|---|---|---|---|
| KR | 20150106647 A | | 9/2015 | |
| WO | WO2008089568 | * | 7/2008 | .......... C01B 17/027 |
| WO | WO2015/017329 | * | 2/2015 | |
| WO | WO2016/181176 | * | 11/2016 | |

OTHER PUBLICATIONS

Written Opinion and International Search Report from parent application PCT/IB2022/056065 mailed Oct. 10, 2022.
C. C, Boswell et al. "Elemental sulfur fertilizers and their use on crops and pastures" by, AgResearch, Invermay agricultural centre, private bag mosgiel, New Zealan, CIAT-Savannas Programme, Cali, Columbia, Fertilizer Research 35: 127-149, Jan. 1, 1993 (Jan. 1, 1993).
Eureka Mondal et al., "Azadirachta indica—A Tree With Multifaceted Applications: An Overview", Department of Zoology, University of Gour Banga, Mokdumpur, Malda, West Bengal, India; Journal of Pharmaceutical Sciences and Research, vol. 8(5), p. 299-306, Jan. 1, 2016 (Jan. 1, 2016).

* cited by examiner

*Primary Examiner* — Trevor Love
(74) *Attorney, Agent, or Firm* — Vorys, Sater, Seymour and Pease LLP

(57)     ABSTRACT
The present invention relates to a solid bio-pesticidal composition comprising of elemental Sulphur in the range of 60% w/w to 99% w/w, Azadirachtin in the range of 0.01% w/w to 20% w/w and at least one agrochemically acceptable excipient wherein particles of the composition is in the range of 0.1 micron to 60 microns, wherein the composition is in the form of water dispersible granules, broadcast granules, extruded granules, spheronised granules and powders. The invention relates to a process of preparing and also to a method for treatment of plant, crop, locus or soil against pests or diseases or managing pesticidal resistance or reducing pesticidal residue by application of a solid bio pesticidal composition. The invention also relates to a method for controlling pests and diseases by applying a solid bio pesticidal composition by foliar means at a dosage of 0.5 kg/ha to 30 kg/ha to a plant or a crop or parts thereof.

21 Claims, No Drawings

SOLID BIO-PESTICIDAL COMPOSITION COMPRISING OF ELEMENTAL SULPHUR AND AZADIRACHTIN

1. FIELD OF THE INVENTION

The present invention relates to a solid bio-pesticidal composition comprising of elemental Sulphur and Azadirachtin. The present invention relates to a solid bio-pesticidal composition comprising of elemental Sulphur, Azadirachtin and at least one agrochemically acceptable excipient. The invention particularly relates to a solid bio-pesticidal composition comprising of elemental Sulphur in the range of 60% w/w to 99% w/w of the total composition, Azadirachtin in the range of 0.01% w/w to 20% w/w of the total composition and at least one agrochemically acceptable excipient, wherein the composition is in the form of water dispersible granules, broadcast granules, extruded granules, spheronised granules and powders. Further, the bio-pesticidal composition comprises particles of the composition in the size range of from 0.1 micron to 60 microns.

The invention also relates to a process of preparing a solid bio-pesticidal composition comprising elemental Sulphur in the range of 60% w/w to 99% w/w of the total composition, Azadirachtin in the range of 0.01% w/w to 20% w/w of the total composition and at least one agrochemically acceptable excipient, wherein the composition is in the form of water dispersible granules, broadcast granules, extruded granules, spheronised granules and powders.

The invention furthermore relates to a method for treatment of plant, crop, locus or soil against pests or diseases or managing pesticidal resistance or reducing pesticidal residue by application of a solid bio pesticidal composition.

The invention also relates to a method for controlling pests and diseases by applying a solid bio pesticidal composition by foliar means at a dosage of 0.5 kg/ha to 30 kg/ha to a plant or a crop or parts thereof or soil. According to further embodiment, the method for controlling pests and diseases wherein the composition is effective against sucking pests, powdery mildew and mites.

2. BACKGROUND OF THE INVENTION

In describing the embodiment of the invention, specific terminology is chosen for the sake of clarity. However, it is not intended that the invention be limited to the specific terms so selected and it is to be understood that each specific term includes all technical equivalents that operate in a similar manner to accomplish a similar purpose.

Elemental Sulphur is not only known as a plant nutrient but also very well known as a pesticide for a long time. Sulphur is an essential element for all organisms and has a wide variety of functions. Sulphur deficiency affects the growth, development, disease resistance, and performance of plants and has a great impact on the nutritional quality of crops. Sulphur is available in different formulations such as suspension concentrate, granules, pellets, powders, etc. for providing it in a form for use as a fertilizer or pesticide against controlling incidence of powdery mildew and mites.

Rampant use of various synthetic pesticidal actives and fertilizers like Urea, Ammonium Nitrate, Ammonium Phosphate, Superphosphate, Potassium Sulphate, Diammonium phosphate is one of the primary reasons for causing extensive damage to the soil and animal health. Indiscriminate use of such synthetic substances in soil and foliar is also giving rise to multiple health related ailments. On account of increased awareness and stringent regulatory norms, there is a demand towards identifying crop solutions that not only reduce crop phytotoxicity and provide broad spectra of activity against various pest but are also effective and can be employed for the purposes of integrated pest management to obviate the negative effect of synthetic chemicals in agriculture. However, the biological properties of known compounds are not entirely satisfactory in the area of effective pest control, addressing environmental concern and worker exposure. For example, it has been observed that pathogens become resistant to pesticides, which are at times administered in higher dosages to achieve the desired control, thereby leading to pesticidal residues, soil toxicity and other environmental hazards, besides the higher costs.

Bio-pesticides and bio-fertilizers pose less threat to the environment, human health, and hence promoted as an effective mode of crop solution and pest management. The bio-pesticides possess many advantages including a high degree of specificity for the target pest, no adverse effect on non-target, beneficial organisms or humans, absence of pest resistance development and absence of residual build up in the environment. Thus, utilization of bio-pesticides in treating pathogenic pests is gaining much importance. With increased awareness towards health and ecological balance, attention is increasingly being paid to the use of natural plant products as a promising option to replace chemicals in bio-pesticidal pest control.

Plant products especially neem and its derivatives have been well reported to possess insecticidal, fungicidal and bactericidal properties. Amongst these derivatives, Azadirachtin, a tetranortriterpenoid has been found to be most potent and possess pesticidal properties that causes feeding inhibition and growth disruption in various insect and pest population. Though it is potent but is simultaneously highly unstable and undergoes rapid degradation at higher temperature, in the presence of water, light and in alkaline or strongly acidic media.

Azadirachtin is relatively stable in crystalline form if stored in the dark. Its laboratory half-life in mildly acidic solutions (pH 4-6) is 50-100 days at room temperature, but rapid decomposition (hydrolysis, isomerization, and/or rearrangement) occurs at higher temperatures, in alkaline and strongly acidic media, and especially in the light (Barrek et al., 2004; Ermel et al., 1987; Jarvis et al., 1998; Sundaram et al., 1995; Szeto and Wan, 1996). The individual limonoids in commercial formulations degrade differently in the field as demonstrated in a recent experiment where the half-lives of Azadirachtin, Azadirachtin B, and salannin on strawberries were approximately 17, 23, and <1 h, respectively (Caboni et al., 2006).

On account of its biological properties and effectiveness against certain pests, Azadirachtin is employed for crop protection and delivered in the form of various formulations like powder, granules, pellets as well as liquid formulations such as emulsifiable concentrate, solutions, suspension, emulsion etc. While farmers would like to resort to the use of safe bio-pesticidal products like Azadirachtin, the commercial use of Azadirachtin has been limited due to the instability of the compound.

CN1391806 discloses a water-based seed coating composition comprising Azadirachtin and Sulphur. The seed coating composition is prepared by mixing actives with surfactant wherein the said mixture is pulverized and a slurry is prepared. The obtained slurry is further mixed with a thickening agent and distilled water to obtain the said composition. However, such liquid compositions carry large amount of water as a carrier and are not feasible while transportation. Also, Azadirachtin being unstable in the presence of water, such liquid compositions get degraded on accelerated storage. This results in marked loss of efficiency of the formulation affecting delivery of actives to the crop. (https://europepmc.org/article/cba/599090)

There is no known effective solid formulation of elemental Sulphur and Azadirachtin indicative of a synergistic effect of both these actives. Furthermore, there is no disclosure of a stable composition of Sulphur and Azadirachtin in a solid dosage form which can be effectively used against various pests obviating the need of synthetic pesticides at a lower dosage and address the limitations observed with conventional bio-pesticidal composition.

Surprisingly, the inventors of the present invention have successfully formulated a stable solid composition of elemental Sulphur and Azadirachtin while overcoming the stability issues inherently associated with Azadirachtin and its ineffectiveness on account of rapid degradation. The inventors of the present invention observed that the composition of the present invention comprising elemental Sulphur and Azadirachtin with an agrochemical excipient, helps to reduce degradation of Azadirachtin by modulating the pH of the composition and thus maintains the stability of Azadirachtin in the formulation. Elemental Sulphur, an active ingredient in the composition of present invention is not only an essential nutrient for crops but also possess insecticidal properties which aids in enhancing the overall efficacy of the composition comprising Azadirachtin in terms of pest control as well as improving crop characteristics such as yield, quality of crops etc.

In addition, sucking pests are a major problem in agriculture and severe measures in terms of synthetic crop protection have to be used in order to control the damage caused by these pests. Neonicotinoids such as Imidacloprid and Thiamethoxam have to be used in order to control pests such as Jassids, Thrips, Whitefly, Aphids and these are reported endocrine disruptors which have a large negative impact on the environment including human and animal health. Farmers spray repeated rounds of these pesticides in order to control the sucking pest population, which further produces resistance to these pesticides and also causes residue problems in the final harvest. There are limited options in terms of addressing sucking pests in terms of safe crop protection measures which do not leave a residue and do not damage the health of beneficial organism and pose a risk to human health and wellbeing.

Inventor of the present invention not only succeeded in formulating a stable synergistic composition of elemental Sulphur and Azadirachtin that overcame the problems associated with the liquid compositions known in the art but were also successful in controlling powerful sucking pests like Jassids, Aphids, Whitefly, Thrips in a much safer way, compared to traditional synthetic neonicotinoids. Not only that, the inventors were also successful in formulating it in a suitable delivery form.

It was also surprisingly found that when the composition is formulated in a solid dosage form with the particles of the composition in the size range of 0.1 micron to 60 microns, the composition of the present invention was effective in treating various pests.

Moreover, most interestingly, the inventors have surprisingly determined that the composition of the present invention when applied as a foliar spray at a determined dose rate, can avoid or replace synthetic crop protection sprays, and minimize pesticide residue and helps manage pesticide resistance. Particularly, in areas where there are limited synthetic crop protection measures available, there is a greater need to manage pesticide resistance due to repeated pesticide sprays. The composition of the present invention provides a potent option and solution in integrated pest management and creates the possibility to reduce the number of chemical sprays.

Furthermore, the inventors of the present invention have identified that a composition comprising of elemental Sulphur and Azadirachtin with a specific concentration range in a solid dosage form such as granules or powders wherein particles of the composition is in the range of 0.1 micron to 60 microns provides better physical properties like suspensibility, dispersibility not only at room temperature but also on accelerated storage condition. The composition formulated at a particle size range of 0.1 micron to 60 microns additionally has desirable suspensibility which minimizes caking of the sample and improves ease of application to the crops and consequently enhances efficacy of the composition.

Thus, the inventors of the present invention have developed a stable bio-pesticidal composition comprising of elemental Sulphur in the range of 60% w/w to 99% w/w of the total composition, Azadirachtin in the range of 0.01% w/w to 20% w/w of the total composition and at least one agrochemically acceptable excipient, wherein the composition is in the form of water dispersible granules, broadcast granules, extruded granules, spheronised granules and powders with particles of the composition in the size range of 0.1 micron to 60 microns which is synergistic and exhibit superior efficacy. The composition of the present invention also exhibits superior physical characteristics such as suspensibility, dispersibility, wettability and also demonstrated superior performance under accelerated storage conditions. Moreover, the composition exhibits an enhanced field efficacy providing better crop protection, improved yield at reduced dosages of application of the composition.

3. SUMMARY OF THE INVENTION

The present invention relates to a solid bio-pesticidal composition comprising of elemental Sulphur, Azadirachtin, and at least one agrochemically acceptable excipient.

More particularly, the invention relates to a solid bio-pesticidal composition comprising of elemental Sulphur in the range of from 60% w/w to 99% w/w of the total composition, Azadirachtin in the range of 0.01% w/w to 20% w/w of the total composition and at least one agrochemically acceptable excipient, wherein the composition is in the form of water dispersible granules, broadcast granules, extruded granules, spheronised granules and powders. The composition comprises of particles in the size range of 0.1 micron to 60 microns.

The bio-pesticidal composition is in the form of powder or granules. The term pesticidal composition includes spheronised granules, extruded granules, broadcast granules, water dispersible granules or powder.

According to another embodiment, the invention relates to a process of preparation of a solid bio-pesticidal composition comprising of elemental Sulphur in the range of from 60% w/w to 99% w/w of the total composition, Azadirachtin in the range of 0.01% w/w to 20% w/w of the total composition and at least one agrochemically acceptable excipient.

According to another embodiment, the invention also relates to a method of protection of crop or improving its health or yield, by treating at least one of a plant, crop or surrounding soil with a solid bio-pesticidal composition.

The invention also relates to a method for treatment of plant, crop, locus or soil against pests or diseases or managing pesticidal resistance or reducing pesticidal residue by application of a solid bio pesticidal composition.

The invention also relates to a method for controlling pests and diseases by applying a solid bio pesticidal composition by foliar means at a dosage of 0.5 kg/ha to 30 kg/ha to a plant or a crop or parts thereof or soil. According to further embodiment, the method for controlling pests and diseases wherein the composition is effective against sucking pests, powdery mildew and mites.

4. DETAILED DESCRIPTION OF THE INVENTION

In describing the embodiment of the invention, specific terminology is chosen for the sake of clarity. However, it is not intended that the invention be limited to the specific terms so selected and it is to be understood that such specific terms include all technical equivalents that operate in a similar manner to accomplish a similar purpose. It is understood that any numerical range recited herein is intended to include all subranges subsumed. Also, unless denoted otherwise percentage of components in a composition are presented as weight percent.

The terms "a" or "an", as used herein, are defined as one or more than one. The terms "including" and/or "having", as used herein, are defined as comprising (i.e., open language).

Granules refers mainly to water dispersible granules, extruded granules or spheronised granules or broadcast granules.

A water dispersible granule is defined as a formulation which disperses or dissolves rapidly when added to water to give a fine particle suspension. As described herein, "WG" or "WDG" refer to water dispersible granules. Water-dispersible granules are formulated as small, easily measured granules (an agglomeration of fine particles) by blending and agglomerating a ground solid active ingredient together with surfactants and other formulation ingredients which disperse into finer/primary particles when immersed in water.

The water dispersible granules are obtained by spray drying or by extrusion process.

As defined herein, powder refers to a wettable powder, dusting powder.

As defined herein, WP refers to a wettable powder, which can be a powder formulation to be applied as a suspension after dispersion in water.

As described herein, "GR" refers to extruded granules or spheronised granules or broadcast granules.

As defined herein, the unit kilogram per hectare also refers to Kg/ha.

The present invention relates to a solid bio-pesticidal composition comprising of elemental Sulphur in the range of from 60% w/w to 99% w/w of the total composition, Azadirachtin in the range of 0.01% w/w to 20% w/w of the total composition and at least one agrochemically acceptable excipient.

The present invention further relates to a solid bio-pesticidal composition comprising of elemental Sulphur in the range of from 60% w/w to 99% w/w of the total composition, Azadirachtin in the range of 0.01% w/w to 20% w/w of the total composition and at least one agrochemically acceptable excipient, wherein the composition is in the form of water dispersible granules, broadcast granules, extruded granules, spheronised granules and powder.

According to an embodiment, elemental Sulphur is present in the range of 60% w/w to 99% w/w of the total composition. According to an embodiment, elemental Sulphur is present in the range of 60% w/w to 95% w/w of the total composition. According to an embodiment, elemental Sulphur is present in the range of 60% w/w to 90% w/w of the total composition. According to an embodiment, elemental Sulphur is present in the range of 60% w/w to 80% w/w of the total composition. According to an embodiment, elemental Sulphur is present in the range of 60% w/w to 70% w/w of the total composition.

According to an embodiment, Azadirachtin is present in the range of 0.01% w/w to 20% w/w of the total weight of the composition. According to an embodiment, Azadirachtin is present in the range of 0.01% w/w to 15% w/w of the total weight of the composition. According to an embodiment, Azadirachtin is present in the range of 0.01% w/w to 10% w/w of the total weight of the composition. According to an embodiment, Azadirachtin is present in the range of 0.01% w/w to 5% w/w of the total weight of the composition. According to an embodiment, Azadirachtin is present in the range of 0.01% w/w to 3% w/w of the total weight of the composition. According to an embodiment, Azadirachtin is present in the range of 0.01% w/w to 2% w/w of the total weight of the composition. According to an embodiment, Azadirachtin is present in the range of 0.01% w/w to 1% w/w of the total weight of the composition. Azadirachtin is commercially manufactured, extracted and available through various commercial vendors in India and abroad.

According to an embodiment, the bio-pesticidal composition is in the form of granules or powders. According to an embodiment, the bio-pesticidal composition in the form of powders includes wettable powder, dusting powder. According to an embodiment, the bio-pesticidal composition in the form of granules include spheronised granules, extruded granules, broadcast granules, water dispersible granules.

According to an embodiment, the bio-pesticidal composition preferably is in the form of water dispersible granules, wettable powder, broadcast granules, extruded granules or spheronised granules.

According to further embodiment, the bio-pesticidal composition comprises particles of the composition in the size range of 0.1 micron to 60 microns. According to further embodiment, bio-pesticidal composition comprises particles of the composition in the size range of 0.1 micron to 50 microns. According to further embodiment, bio-pesticidal composition comprises particles of the composition in the size range of 0.1 micron to 40 microns. According to further embodiment, bio-pesticidal composition comprises particles of the composition in the range of 0.1 micron to 30 microns. According to further embodiment, bio-pesticidal composition comprises particles of the composition in the size range of 0.1 micron to 25 microns. According to further embodiment, bio-pesticidal composition comprises particles of the composition in the size range of 0.1 micron to 20 microns. According to further embodiment, bio-pesticidal composition comprises particles of the composition in the size range of 0.1 micron to 15 microns. According to further embodiment, bio-pesticidal composition comprises particles of the composition in the size range of 0.1 micron to 10 microns.

It has been observed that the bio-pesticidal composition comprising of particles in the size range of 0.1 to 60 microns has desirable suspensibility which minimizes caking of the sample and consequently improve ease of application to the crops resulting in enhanced efficacy of the composition. Furthermore, the composition owing to its particle size results in improved suspensibility of the composition and when applied as foliar provides better leaf coverage which in turn increases the availability of actives on the leaf surface and enhances protection of the plants from pest attack.

Moreover, the smaller particles increase the surface area which results in better absorption when delivered to the plant rhizosphere.

According to an embodiment, the granule size of the bio-pesticidal composition of the present invention is in the size range of 0.05 to 6 mm, preferably in the size range of 0.05 to 5 mm, preferably in the size range 0.05 to 4 mm, preferably in the size range 0.05 to 3 mm, preferably in the size range 0.05 to 2.5 mm.

According to an embodiment, the bio-pesticidal composition of the present invention is in the form of spheronised or extruded or broadcast granules; wherein the granules are in the size range of 0.05 to 6 mm, preferably in the size range of 0.05 to 5 mm, preferably in the size range 0.05 to 4 mm, preferably in the size range 0.05 to 3 mm, preferably in the size range 0.05 to 2.5 mm.

According to an embodiment, the bio-pesticidal composition of the present invention is in the form of water dispersible granules, wherein the granules are in the size range of 0.05 to 2.5 mm, preferably in the size range of 0.05 to 2.0 mm, preferably in the size range of 0.05 to 1.5 mm, preferably in the size range of 0.05 to 1 mm, preferably in the size range of 0.05 to 0.5 mm.

According to an embodiment, the granules disperse into particles in the size range of 0.1 micron to 60 microns, preferably in the size range of 0.1 micron to 30 microns, more preferably in the size range of 0.1 micron to 20 microns.

It has been surprisingly found that the bio-pesticidal composition of the present invention has enhanced and improved physical properties of dispersibility, suspensibility, wettability, provides ease of handling and also reduces the loss of material while handling the product at the time of packaging as well as during field application. The composition of the present invention is stable on accelerated storage.

Suspensibility is defined as the amount of active ingredient suspended after a given time in a column of liquid, of stated height, expressed as a percentage of the amount of active ingredient in the original suspension. The suspensibility of suspension concentrate is determined as per CIPAC MT-161 by preparing 250 ml of diluted suspension, allowing it to stand in a measuring cylinder under defined conditions, and removing the top nine-tenths. The remaining tenth is then assayed chemically, gravimetrically or by solvent extraction, and the suspensibility is calculated.

According to an embodiment, the suspensibility of the bio-pesticidal composition is at least 30%. According to an embodiment, the suspensibility of the composition is at least 40%. According to an embodiment, the suspensibility of the composition is at least 50%. According to an embodiment, the suspensibility of the composition is at least 60%. According to an embodiment, the suspensibility of the composition is at least 70%. According to an embodiment, the suspensibility of the composition is at least 80%. According to an embodiment, the suspensibility of the composition is at least 90%. According to an embodiment, the suspensibility of the composition is at least 95%.

According to an embodiment, the bio-pesticidal composition demonstrates superior stability in terms of suspensibility under accelerated storage condition (ATS). According to an embodiment, the bio-pesticidal composition demonstrates suspensibility of at least 90% under ATS. According to an embodiment, the bio-pesticidal composition demonstrates suspensibility of at least 80% under ATS. According to an embodiment, the bio-pesticidal composition demonstrates suspensibility of at least 60% under ATS. According to an embodiment, the bio-pesticidal composition demonstrates suspensibility of at least 50% under ATS. According to an embodiment, the bio-pesticidal composition demonstrates suspensibility of at least 30% under ATS.

Dispersibility of the bio-pesticidal composition is a measure of percent dispersion. Dispersibility is calculated by the minimum percent dispersion. Dispersibility is defined as the ability of the granules to disperse upon addition to a liquid such as water or a solvent. Dispersibility of the granular composition of the present application, was determined as per the standard CIPAC test, MT 174. A known amount of the granular composition was added to a defined volume of water and mixed by stirring to form a suspension. After standing for a short period, the top nine-tenths are drawn off and the remaining tenth is dried and determined gravimetrically. The method is virtually a shortened test of suspensibility and is appropriate for establishing the ease with which the granular composition dispersed uniformly in water.

According to an embodiment, the bio-pesticidal composition exhibits almost instantaneous dispersion.

According to another embodiment, the bio-pesticidal composition makes the actives available instantaneously and also over a longer period which may extend throughout the crop cycle, providing an immediate and sustained release of actives eventually strengthening and protecting the crop at each and every stage of the crop cycle.

According to an embodiment, the dispersibility of the bio-pesticidal composition is at least 30%. According to an embodiment, the dispersibility of the bio-pesticidal composition is at least 40%. According to an embodiment, the dispersibility of the bio-pesticidal composition is at least 50%. According to an embodiment, the dispersibility of the bio-pesticidal composition is at least 60%. According to an embodiment, the dispersibility of the bio-pesticidal composition is at least 70%. According to an embodiment, the dispersibility of the bio-pesticidal composition is at least 80%. According to an embodiment, the dispersibility of the bio-pesticidal composition is at least 90%. According to an embodiment, the dispersibility of the bio-pesticidal composition is at least 95%.

According to an embodiment, the bio-pesticidal composition demonstrates a dispersibility of at least 90% under ATS. According to an embodiment, the bio-pesticidal composition demonstrates a dispersibility of at least 80% under ATS. According to an embodiment, the bio-pesticidal composition demonstrates a dispersibility of at least 60% under ATS. According to an embodiment, the bio-pesticidal composition demonstrates a dispersibility of at least 40% under ATS. According to an embodiment, the bio-pesticidal composition demonstrates a dispersibility of at least 30% under ATS.

Wettability is the condition or the state of being wettable and is defined as the degree to which a solid is wetted by a liquid, measured by the force of adhesion between the solid and liquid phases. The wettability of the granular composition is measured using the Standard CIPAC Test MT-53 which describes a procedure for the determination of the time of complete wetting of wettable formulations. A weighed amount of the granular composition is dropped on water in a beaker from a specified height and the time for complete wetting was determined.

According to an embodiment, the bio-pesticidal composition in the form of water dispersible granules, extruded granules, spheronised granules, broadcast granules or powders has wettability of less than 2 minutes. According to another embodiment, the bio-pesticidal composition has wettability of less than 1 minute. According to another embodiment, the bio-pesticidal composition has wettability of less than 30 seconds.

According to an embodiment, the bio-pesticidal composition of the present invention demonstrates superior stability towards heat, light, temperature and caking. According to an embodiment, the stability exhibited by the composition is at least 3 years. According to further embodiment, the stability exhibited by the composition is at least 2 years. According to further embodiment, the stability exhibited by the composition is at least 1 year. According to further embodiment, the stability exhibited by the composition is at least 6 months.

According to an embodiment, the bio-pesticidal composition of the present invention on accelerated storage have Azadirachtin content of not less than 50% of that of Azadirachtin active content available at room temperature. According to an embodiment, the bio-pesticidal composition of the present invention on accelerated storage have Azadirachtin content of not less than 75% of that of Azadirachtin active content available at room temperature. According to an embodiment, the bio-pesticidal composition of the present invention on accelerated storage has an Azadirachtin content of not less than 85% relative to the active content at room temperature. According to an embodiment, the bio-pesticidal composition of the present invention on accelerated storage has an Azadirachtin content of not less than 95% relative to the active content at room temperature.

According to further embodiment, the composition comprises at least one agrochemically acceptable excipient which includes one or more of wetting agents, dispersants, polymeric dispersant, hydrophobic carrier or water repellent, emulsifiers, binding agents or binders, fillers or carriers or diluents, sticking agents, disintegrating agents, spreading agents, surfactants, buffers or pH adjusters or neutralizing agents, stabilizers, processing additives, chelating or complexing or sequestering agents, anticaking agents, agglomeration antifoam agents or foam suppressants or mixtures thereof. However, those skilled in the art will appreciate that it is possible to utilize other excipients without departing from the scope of the present invention. These excipients are commercially manufactured and available through various companies.

According to an embodiment, the excipient is present in the range of from 0.01% w/w to 40% w/w of the total composition. According to an embodiment, the excipient is present in the range of from 0.01% w/w to 30% w/w of the total composition. According to an embodiment, the excipient is present in the range of from 0.01% w/w to 20% w/w of the total composition.

According to an embodiment, the surfactants which are used in bio-pesticidal composition include one or more of emulsifiers, wetting agents and dispersing agents. According to an embodiment, the surfactants which are used in the bio-pesticidal composition include one or more of anionic, cationic, non-ionic, amphoteric and polymeric surfactants.

The anionic surfactants include one or more of, but not limited to a salt of fatty acid, a benzoate, a polycarboxylate, a salt of alkylsulfuric acid ester, alkyl ether sulfates, an alkyl sulfate, an alkylarylsulfate, an alkyl diglycol ether sulfate, a salt of alcohol sulfuric acid ester, an alkyl sulfonate, an alkylaryl sulfonate, an aryl sulfonate, a lignin sulfonate, an alkyl diphenyl ether disulfonate, a polystyrene sulfonate, a salt of alkylphosphoric acid ester, an alkylaryl phosphate, a styrylaryl phosphate, sulfonate docusates, a salt of polyoxyethylene alkyl ether sulfuric acid ester, a polyoxyethylenealkylaryl ether sulfate, alkyl sarcosinates, alpha olefin sulfonate sodium salt, alkyl benzene sulfonate or its salts, sodium lauroylsarcosinate, sulfosuccinates, polyacrylates, polyacrylates—free acid and sodium salt, salt of polyoxyethylenealkylaryl ether sulfuric acid ester, a polyoxyethylene alkyl ether phosphate, a salt of polyoxyethylenealkylaryl phosphoric acid ester, sulfosuccinates—mono and other diesters, phosphate esters, alkyl naphthalene sulfonate-isopropyl and butyl derivatives, alkyl ether sulfates—sodium and ammonium salts; alkyl aryl ether phosphates, ethylene oxides and its derivatives, a salt of polyoxyethylene aryl ether phosphoric acid ester, mono-alkyl sulphosuccinates, aromatic hydrocarbon sulphonates, 2-acrylamido-2-methyl-propane sulfonic acid, ammonium laurylsulphate, Docusate, Disodium cocoamphodiacetate, Magnesium laurethsulfate, Potassium lauryl sulfate, Sodium alkyl sulfate, Sodium dodecyl sulfate, Sodium dodecylbenzenesulfonate, Sodium laurate, Sodium laurethsulfate, Sodium lauroylsarcosinate, Sodium myrethsulfate, Sodium nonanoyloxybenzene-sulfonate, alkyl carboxylates, Sodium stearate, alpha olefin sulphonates, naphthalene sulfonate salts, alkyl naphthalene sulfonate fatty acid salts, naphthalene sulfonate condensates-sodium salt, fluoro carboxylate, fatty alcohol sulphates, alkyl naphthalene sulfonate condensates-sodium salt, a naphthalene sulfonic acid condensed with formaldehyde or a salt of alkylnaphthalene sulfonic acid condensed with formaldehyde; or salts, derivatives thereof.

The non-ionic surfactants include one or more of but not limited to polyol esters, polyol fatty acid esters, polyethoxylated esters, polyethoxylated alcohols, ethoxylated and propoxylated fatty alcohols, ethoxylated and propoxylated alcohols, Ethylene oxide (EO)/Propylene oxide (PO) copolymers; EO and PO block copolymers, di, tri-block copolymers; block copolymers of polyethylene glycol and polypropylene glycol, poloxamers, polysorbates, alkyl polysaccharides such as alkyl polyglycosides, alkyl polyglucamides and blends thereof, amine ethoxylates, sorbitan fatty acid ester, glycol and glycerol esters, glucosidyl alkyl ethers, sodium tallowamine ethoxylate, polyoxyethylene glycol, sorbitan alkyl esters, sorbitan derivatives, fatty acid esters of sorbitan (Spans) and their ethoxylated derivatives (Tweens), and sucrose esters of fatty acids, Cocamide diethanolamine (DEA), Cocamide monoethanolamine (MEA), Decyl glucoside, Decylpolyglucose, Glycerol monostearate, Lauryl glucoside, Maltosides, Monolaurin, Narrow-range ethoxylate, Nonidet P-40, Nonoxynol-9, Nonoxynols, Octaethylene glycol monododecyl ether, N-Octyl beta-D-thioglucopyranoside, Octyl glucoside, Oleyl alcohol ethoxylate, PEG-10 sunflower glycerides, Pentaethylene glycol monododecyl ether, Polidocanol, Poloxamer, Poloxamer 407, Polyethoxylated tallow amine, Polyglycerol polyricinoleate, Polysorbate, Polysorbate 20, Polysorbate 80, Sorbitan, Sorbitan monolaurate, Sorbitan monostearate, Sorbitan tristearate, Stearyl alcohol ethoxylate, glyceryl laureate, lauryl glucoside, nonylphenolpolyethoxyethanols, nonyl phenol polyglycol ether, castor oil ethoxylate, polyglycol ethers, polyadducts of ethylene oxide and propylene oxide, block copolymer of polyalkylene glycol ether and hydroxystearic acid, tributylphenoxypolyethoxy ethanol, octylphenoxypolyethoxy ethanol, ethopropoxylatedtristyrlphenols, ethoxylated alcohols, polyoxy ethylene sorbitan, fatty acid polyglyceride, a fatty acid alcohol polyglycol ether, acetylene glycol, acetylene alcohol, an oxyalkylene block polymer, polyoxyethylene alkyl ether, polyoxyethylenealkylaryl ether, a polyoxyethylenestyrylaryl ether, a polyoxyethylene glycol alkyl ether, polyethylene glycol, a polyoxyethylene fatty acid ester, a polyoxyethylenesorbitan fatty acid ester, a polyoxyethyleneglycerin fatty acid ester, Alcohol ethoxylates-C6 to C16/18 alcohols, linear and branched, Alcohol alkoxylates—various hydrophobes and EO/PO contents and ratios, Fatty acid esters-mono and diesters; lauric, stearic and oleic; Glycerol esters—with and without EO; lauric, stearic, cocoa and tall oil derived, Ethoxylated glycerine, Sorbitan esters—with and without EO; lauric, stearic and oleic based; mono and trimesters, Castor oil ethoxylates-5 to 200 moles EO; non-hydrogenated and hydrogenated, Block polymers, Amine oxides—ethoxylated and non-ethoxylated; alkyl dimethyl, Fatty amine ethoxylates—coco, tallow, stearyl, oleyl amines, a polyoxyethylene hydrogenated castor oil or a polyoxypropylene fatty acid ester; salts or derivatives thereof.

Amphoteric or Zwitterionic surfactants include one or more of, but not limited to one or more of betaine, coco and lauryl amidopropyl betaines, Coco Alkyl Dimethyl Amine Oxides, alkyl dimethyl betaines; C8 to C18, Alkyl dipropionates—sodium lauriminodipropionate, Cocoamidopropyl hydroxyl sulfobetaine, imidazolines, phosphatidylserine, phosphatidylcholine, and sphingomyelins, Lauryl Dimethylamine Oxide, alkyl amphoacetates and propionates, alkyl Ampho(di)acetates, and di-propionates, and ethanolamine fatty amides; or salts, derivatives thereof.

Surfactants that are commercially available under the trademark but are not limited to one or more of Atlas G5000, TERMUL 5429, TERMUL 2510, ECOTERIC®, EULSO-GEN® 118, Genapol® X, Genapol® OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, Cetomacrogol 1000, CHEMONIC OE-20, Triton N-101, Triton X-100, Tween 20, 40, 60, 65, 80, Span20, 40, 60, 80, 83, 85, 120, Brij®, Atlox 4912, Atlas G5000, TERMUL 3512, TERMUL 3015, TERMUL 5429, TERMUL 2510, ECOTERIC®, ECOTERIC® T85, ECO-TERIC® T20, TERIC 12A4, EMULSOGEN® 118, Genapol® X, Genapol® OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHEMONIC OE-20, Triton™ N-101, IGEPAL CA-630 and Isoceteth-20.

However, those skilled in the art will appreciate that it is possible to utilize other conventionally known surfactants without departing from the scope of the present invention. The surfactants are commercially manufactured and available through various companies.

According to an embodiment, the surfactant is present in an amount of 0.1% to 40% w/w of the total composition. According to an embodiment; the surfactant is present in an amount of 0.1% to 30% w/w of the total composition. According to a further embodiment, the surfactant is present in an amount of 0.1% to 20% w/w of the total composition. According to an embodiment, the surfactant is present in an amount of 0.1% to 10% w/w of the total composition.

According to an embodiment, the disintegrating agents which are used in the bio-pesticidal composition include, but not limited to one or more of inorganic water soluble salts e.g. sodium chloride, nitrate salts; water soluble organic compounds such as starch, modified starch, hydroxypropyl starch, carboxymethyl starch ether, microcrystalline cellulose, cross-linked sodium carboxymethyl cellulose, carboxymethyl cellulose, carboxymethyl cellulose calcium, sodium tripolyphosphate, sodium hexametaphosphate, a cellulose powder, dextrin, methacrylate copolymer, Polyplasdone® XL-10 (crosslinked polyvinylpyrrolidone), poly (vinylpyrrolidone), sulfonated styrene-isobutylene-maleic anhydride copolymer, salts of polyacrylates of methacrylates, starch-polyacrylonitrile graft copolymer, or their mixtures or salts or derivatives thereof. However, those skilled in the art will appreciate that it is possible to utilize different disintegrating agents without departing from the scope of the present invention. The disintegrating agents are commercially manufactured and available through various companies.

According to an embodiment, the disintegrating agent is present in an amount of 0.1% to 40% w/w of the composition. According to an embodiment, the disintegrating agent is present in an amount of 0.1% to 30% w/w of the composition. According to an embodiment, the disintegrating agent is present in an amount of 0.1% to 20% w/w of the composition. According to an embodiment, the disintegrating agent is present in an amount of 0.1% to 10% w/w of the composition.

According to an embodiment, the hydrophobic agents which are used in the bio-pesticidal composition include one or more of, but not limited to modified starch, hydrophobically modified silica, hydrophobically modified bentonite, hydrophobically modified attapulgite, talc, metal stearates and fluorinated silanes. However, those skilled in the art will appreciate that it is possible to utilize different hydrophobic agents without departing from the scope of the present invention. According to an embodiment, the hydrophobic agent is present in the concentration of 0.01% to 50% w/w of the total composition.

According to an embodiment, the binding agents or binders which are used in the bio-pesticidal composition include, but not limited to one or more of, carbohydrates such as monosaccharides, disaccharides, oligosaccharides and polysaccharides, complex organic substance, lignin sulfonates, polyvinylpyrrolidone, synthetic organic polymers or derivatives and combinations thereof. However, those skilled in the art will appreciate that it is possible to utilize different binding agents without departing from the scope of the present invention. The binding agents are commercially manufactured and available through various companies.

According to further embodiment, the binding agent is present in an amount of 0.1% to 30% w/w of the composition. According to further embodiment, the binding agent is present in an amount of 0.1% to 20% w/w of the composition. According to further embodiment, the binding agent is present in an amount of 0.1% to 10% w/w of the composition.

According to an embodiment, the carriers which are used in the bio-pesticidal composition include, but are not limited to one or more of solid carriers or fillers or diluents. According to another embodiment, the carriers include mineral carriers, plant carriers, synthetic carriers, water-soluble carriers. However, those skilled in the art will appreciate that it is possible to utilize different carriers without departing from the scope of the present invention. The carriers are commercially manufactured and available through various companies.

The solid carriers include natural minerals like clay such as china clay, acid clay, kaolin such as kaolinite, dickite, nacrite, and halloysite, serpentines such as chrysotile, lizardite, antigorite, and amesite, synthetic and diatomaceous silicas, montmorillonite minerals such as sodium montmorillonite, smectites, such as saponite, hectorite, sauconite, and hyderite, micas, such as pyrophyllite, talc, agalmatolite, muscovite, phengite, sericite, and illite, silicas such as cristobalite and quartz, such as attapulgite and sepiolite; vermiculite, laponite, pumice, bauxite, hydrated aluminas, perlite, sodium bicarbonate, volclay, vermiculites, limestone, natural and synthetic silicates, charcoal, silicas, wet process silicas, dry process silicas, calcined products of wet process silicas, surface-modified silicas, mica, zeolite, diatomaceous earth, derivatives thereof; chalks (Omya®), fuller's earth, loess, mirabilite, white carbon, slaked lime, synthetic silicic acid, starch, modified starch (Pineflow, available from Matsutani Chemical industry Co., Ltd.), cellulose, plant carriers such as cellulose, chaff, wheat flour, wood flour, starch, rice bran, wheat bran, and soyabean flour, casein sodium, sucrose, salt cake, potassium pyrophosphate, sodium tripolyphosphate, or derivatives or mixtures thereof. Commercially available Silicates are Aerosil brands, Sipernat brands as Sipernat @50S and CALFLO E, and kaolin 1777. However, those skilled in the art will appreciate that it is possible to utilize different solid carriers without departing from the scope of the present invention. The solid carriers are commercially manufactured and available through various companies.

According to further embodiment, the carrier is present in an amount of 0.1% to 40% w/w of the composition. According to further embodiment, the carrier is present in an amount of 0.1% to 20% w/w of the composition. According to further embodiment, the carrier is present in an amount of 0.1% to 15% w/w of the composition.

According to an embodiment, the antifoaming agents or defoamers which are used in the bio-pesticidal composition include, but not limited to one or more of silica, siloxane, silicon dioxide, polydimethyl siloxane, dimethicone, simethicone, alkyl polyacrylates, ethylene oxide/propylene oxide copolymers, polyethylene glycol, Silicone oils and magnesium stearate or derivatives thereof. Preferred antifoaming agents include silicone emulsions (such as, e.g., Silikon® SRE, Wacker or Rhodorsil® from Rhodia), long-chain alcohols, fatty acids, fluoro-organic compounds. However, those skilled in the art will appreciate that it is possible to utilize other conventionally known antifoaming agents without departing from the scope of the present invention. The antifoaming agents are commercially manufactured and available through various companies.

According to an embodiment, the anti-foaming agent is present in an amount of 0.01% to 20% w/w of the total composition.

According to an embodiment, the pH-adjusters or buffers or neutralizing agents which are used in the bio-pesticidal composition include both acids and bases of the organic or inorganic type and mixtures thereof. According to further embodiment, pH-adjusters or buffers or neutralizing agents include, but not limited to one or more of organic acids, inorganic acids and alkali metal compounds or salts, derivatives thereof. According to an embodiment, the organic acids include, but not limited to one or more of citric, malic, adipic, fumaric, maleic, succinic, and tartaric acid, or salts, derivatives thereof; and the mono-, di-, or tribasic salts of these acids or derivatives thereof. Alkali metal compounds include, but not limited to one or more of hydroxides of alkali metals such as sodium hydroxide and potassium hydroxide, carbonates of alkali metals such as sodium carbonate, hydrogen carbonates of alkali metals such as sodium hydrogen carbonate and alkali metal phosphates such as sodium phosphate and mixtures thereof. According to an embodiment, the salts of inorganic acids include, but not limited to one or more of alkali metal salts such as, sodium chloride, potassium chloride, sodium nitrate, potassium nitrate, sodium sulfate, potassium sulfate, sodium monohydrogen phosphate, potassium monohydrogen phosphate, sodium dihydrogen phosphate, potassium dihydrogen phosphate and the like. Mixtures are also used to create a pH-adjusters or buffers or neutralizing agents. However, those skilled in the art will appreciate that it is possible to utilize other conventionally known pH-adjusters or buffers or neutralizing agents without departing from the scope of the present invention. The pH-adjusters or buffers or neutralizing agents are commercially manufactured and available through various companies.

According to an embodiment, the pH-adjusters or buffers are present in an amount of 0.01% to 20% w/w of the total composition. According to an embodiment, the pH-adjusters or buffers are present in an amount of 0.01% to 10% w/w of the total composition. According to an embodiment, the pH-adjusters or buffers are present in an amount of 0.01% to 5% w/w of the total composition. According to an embodiment, the pH-adjusters or buffers are present in an amount of 0.01% to 1% w/w of the total composition.

According to an embodiment, the spreading agents which are used in the bio-pesticidal composition include, but not limited to one or more of a copolymer of maleic acid with a styrene compound silicone based surfactants, silwet, a (meth)acrylic acid copolymer, a half ester of a polymer consisting of polyhydric alcohol with dicarboxylic anhydride, a water-soluble salt of polystyrene sulfonic acid, fatty acids, aliphatic alcohols, vegetable oils such as cottonseed, petroleum distillates, modified trisiloxanes, polyglycol, polyethers, clatharates or salts or derivatives thereof. However, those skilled in the art will appreciate that it is possible to utilize other conventionally known spreading agents without departing from the scope of the present invention. The spreading agents are commercially manufactured and available through various companies.

According to an embodiment, the spreading agent is present in an amount of 0.01% to 20% w/w of the total composition. According to an embodiment, the spreading agent is present in an amount of 0.01% to 5% w/w of the total composition.

According to an embodiment, the sticking agents which are used in the bio-pesticidal composition include, but not limited to one or more of paraffin, a polyamide resin, polyacrylate, polyoxyethylene, wax, polyvinyl alkyl ether, an alkylphenol-formalin condensate, fatty acids, latex, polyvinyl pyrrolidone, aliphatic alcohols, gums such as xanthan gum, gum ghati, gum Arabic etc, vegetable oils such as cottonseed, petroleum distillates, modified trisiloxanes, polyglycol, polyethers, clatharates, a synthetic resin emulsion or salts or derivatives thereof. However, those skilled in the art will appreciate that it is possible to utilize other conventionally known sticking agents without departing from the scope of the present invention. The sticking agents are commercially manufactured and available through various companies.

According to an embodiment, the sticking agent is present in an amount of 0.01% to 30% w/w of the total composition. According to an embodiment, the sticking agent is present in an amount of 0.01% to 15% w/w of the total composition.

According to an embodiment, the stabilizers which are used in the bio-pesticidal composition include, but not limited to one or more of vitamin E and its derivatives, BHA, BHT, ascorbylpalmitate, EDTA, alkyl glyoxylates such as ethyl glyoxylate, zeolite, antioxidants such as phenol compounds, phosphoric acid compounds and the like. However, those skilled in the art will appreciate that it is possible to utilize other conventionally known stabilizers without departing from the scope of the present invention. The stabilizers are commercially manufactured and available through various companies.

According to an embodiment, the stabilizer is present in an amount of 0.01% to 30% w/w of the total composition. According to an embodiment, the stabilizer is present in an amount of 0.01% to 20% w/w of the total composition. According to an embodiment, the stabilizer is present in an amount of 0.01% to 10% w/w of the total composition. According to an embodiment, the stabilizer is present in an amount of 0.01% to 5% w/w of the total composition. According to an embodiment, the stabilizer is present in an amount of 0.01% to 1% w/w of the total composition.

According to an embodiment, the UV ray scattering agents include, but not limited to titanium dioxide or the like may be used. However, those skilled in the art will appreciate that it is possible to utilize different UV ray scattering agents or mixtures thereof without departing from the scope of the present invention. Such UV ray scattering agents are commercially manufactured and available through various companies.

According to another embodiment, the bio-pesticidal composition of the invention is devoid of synthetic pesticidal actives and fertilizers like Urea, Ammonium Nitrate, Ammonium Phosphate, Superphosphate, Potassium Sulphate, Diammonium phosphate synthetic pesticides and fertilizers.

According to an embodiment, the invention further relates to a process of preparation of the solid bio-pesticidal composition. According to an embodiment, the bio-pesticidal composition in the form of granules or powder. According to an embodiment, the bio-pesticidal composition is in the form of wettable powder, dusting powder, water dispersible granules, extruded granules, spheronised granules, or broadcast granules.

According to an embodiment, the invention relates to a process for preparing the bio-pesticidal composition in the form of wettable powder. According to an embodiment, the bio-pesticidal composition in the form of wettable powder involves mixing of elemental Sulphur and at least one agrochemically acceptable excipient in a suitable mixer. Milling the dry mixture through jet mill or air classifier mill and adding Azadirachtin to the dry mixture to obtain a wettable powder. However, those skilled in the art will appreciate that it is possible to modify the process of preparation of wettable powder without departing from the scope of the present invention.

According to another embodiment, the bio-pesticidal composition in the form of water dispersible granules or spheronised granules is made by various techniques such as spray drying, fluidized bed granulation, pan granulation, pin agglomerator, spheronizer, freeze drying etc. The granules are also extruded through the extruder to obtain extruded granules.

According to an embodiment, the process for preparing a water dispersible granular composition involves milling a blend of elemental Sulphur and at least agrochemically excipient to obtain slurry or a wet mix. Azadirachtin technical is added to the slurry and elemental Sulphur-Azadirachtin mixture is mixed for about 5-10 minutes. The obtained wet mix is then dried, for instance in a spray dryer, fluid bed dryer or any suitable granulating equipment, followed by sieving to remove the undersized and oversized granules to obtain water dispersible granules of the desired size if required. However, those skilled in the art will appreciate that it is possible to modify the process without departing from the scope of the present invention.

According to an embodiment, the process for preparing an extruded granule involves mixing and milling of elemental Sulphur and at least one agrochemically acceptable excipient in a suitable mixer such as jet mill or air classifier mill. The milled material is then transferred to a sigma mixer and Azadirachtin technical is added to the milled material. The dry mass preparation is subjected to granulation by adding suitable quantity of water or granulating liquid to prepare a wet mass. Extruding the wet mass through a suitable extruder and drying the extruded granules in a suitable dryer such as rotary vacuum dryer or conveyor dryer or tray dryer or a fluidized bed dryer to obtain extruded granules. However, those skilled in the art will appreciate that it is possible to modify the process without departing from the scope of the present invention.

According to another embodiment, the bio-pesticidal composition is in the form of broadcast granule involves milling a blend of elemental Sulphur; and at least one agrochemically acceptable excipient to obtain slurry or a wet mix. Azadirachtin technical is added to the slurry and elemental Sulphur-Azadirachtin mixture is mixed for about 5-10 minutes. The obtained wet mix is then dried, for instance in a spray dryer, fluid bed dryer or any suitable granulating equipment. The powder or the fine granules is further subjected to agglomeration in an agglomerator by adding at least one filler or carrier to obtain granules of size of the desired size.

According to another embodiment, the invention further relates to a method of application of the bio-pesticidal composition.

According to an embodiment, the invention also relates to a method of protecting crop, controlling plant pathogen, controlling pest, improving the crop health and growth, enhancing crop yield, strengthening the plant. The method comprising treating at least one of a plant, crop, locus or surrounding soil with a solid bio-pesticidal composition which comprises elemental Sulphur in the range of 60% w/w to 99% w/w of the total composition and Azadirachtin in the range of 0.01% w/w to 20% w/w of the total composition and at least one agrochemically acceptable excipient. The bio-pesticidal composition may be sprayed directly to the crop or plant, such as its foliage before it is sown or planted, or to the locus thereof.

According to an embodiment, the invention relates to a method for treatment of plant, crop, locus or soil against pests or diseases or managing pesticidal resistance or reducing pesticidal residue by application of a solid bio pesticidal composition. According to further embodiment, the invention relates to a method for treatment of plant, crop, locus or soil against pests or diseases or managing pesticidal resistance or reducing pesticidal residue by application of a solid bio pesticidal composition at a dosage of 0.5 Kilogram/Hectare (kg/ha) to 30 Kilogram/Hectare (kg/ha).

The bio-pesticidal composition is applied through a variety of methods. Methods of applying to the soil include any suitable method, which ensures that the composition penetrates the soil, for example nursery tray application, in furrow application, soil drenching, soil injection, drip irrigation, sprinkler irrigation and such other methods. The composition is particularly applied in the form of a foliar spray.

According to an embodiment, the invention also relates to method for controlling pests and diseases by applying a solid bio pesticidal composition by foliar means at a dosage of 0.5 kg/ha to 30 kg/ha to a plant or a crop or parts thereof or soil.

According to further embodiment, the invention also relates to method for controlling pests and diseases by applying a solid bio pesticidal composition by foliar means at a dosage of 0.5 kg/ha to 25 kg/ha to a plant or a crop or parts thereof or soil. According to further embodiment, the invention also relates to method for controlling pests and diseases by applying a solid bio pesticidal composition by foliar means at a dosage of 0.5 kg/ha to 20 kg/ha to a plant or a crop or parts thereof or soil. According to further embodiment, the invention also relates to method for controlling pests and diseases by applying a solid bio pesticidal composition by foliar means at a dosage of 0.5 kg/ha to 15 kg/ha to a plant or a crop or parts thereof or soil. According to further embodiment, the invention also relates to method for controlling pests and diseases by applying a solid bio pesticidal composition by foliar means at a dosage of 0.5 kg/ha to 10 kg/ha to a plant or a crop or parts thereof or soil. According to further embodiment, the invention also relates to method for controlling pests and diseases by applying a solid bio pesticidal composition by foliar means at a dosage of 0.5 kg/ha to 5 kg/ha to a plant or a crop or parts thereof or soil. According to further embodiment, the invention also relates to method for controlling pests and diseases by applying a solid bio pesticidal composition by foliar means at a dosage of 0.5 kg/ha to 2.5 kg/ha to a plant or a crop or parts thereof or soil. According to further embodiment, the method for controlling pests and diseases wherein the composition is effective against sucking pests, powdery mildew and mites.

According to further embodiment, the method for controlling pests and diseases wherein the composition is effective against powdery mildew at a dosage of 0.5 kg/ha to 30 kg/ha.

According to further embodiment, the method for controlling pests and diseases wherein the composition is effective against sucking pests at a dosage of 0.5 kg/ha to 20 kg/ha. The pests controlled by the bio-pesticidal composition of the present invention include sucking pests such as Thrips, Aphids, Jassids, Whiteflies etc.

According to further embodiment, the method for controlling pests and diseases wherein the composition is effective against mites at a dosage of 0.5 kg/ha to 10 kg/ha. The mites controlled by the bio-pesticidal composition of the present invention include Red spider mites, two spotted spider mites, yellow mites, scarlet mites, pink mites, purple mites etc.

The rates of application or the dosage of the composition depends on the type of use, the target pests or diseases, the degree of disease and pest infestation, the type of crops and also on the specific active ingredients in the composition and the amounts in which they are used, such that the pesticidal active ingredient, is in an effective amount to provide the desired action (such as crop protection, crop yield). According to an embodiment, the composition of the present invention can be applied as single dose or in multiple doses. For instance, for control of powdery mildew in grapes, the composition can be applied for 2 sprays up to 15 sprays, depending on conditions and disease pressure.

According to an embodiment, the composition of the present invention is synergistic in nature and is suitable for integrated pest and nutrient management. It was found that the combination of elemental Sulphur and Azadirachtin has good control on plant pathogens such as fungal, bacterial pathogens as compared to application of individual actives. Further such composition also helps in improving the crop yield, crop characteristics etc. Thus, it has been observed that the composition of the present invention, demonstrate enhanced, efficacious and superior behaviour in the fields at reduced dosage.

A. PREPARATION EXAMPLES

The following examples illustrate the basic methodology and versatility of the composition of the invention. It should be noted that this invention is not limited to these exemplifications and can be extrapolated to overall claimed concentration range of the components and to the various formulation types as claimed in the present invention.

1. Water Dispersible Granular composition of 80% elemental Sulphur and 0.5% Azadirachtin.

Water dispersible granular composition was prepared by blending and milling of 81 parts of elemental Sulphur, 10 parts of calcium lignin sulfonate, 5.70 parts of maltodextrin, 1.8 part of titanium dioxide. The blend obtained was milled to get a powder having particle size of less than 50 microns. The milled material is then transferred to a sigma mixer and 1.5 parts of Azadirachtin (33% purity) is added to the milled material. The dry mass preparation is subjected to granulation by adding suitable quantity of water or granulating liquid to prepare a wet mass. Extruding the wet mass through a suitable extruder and drying the extruded granules in a suitable dryer to obtain extruded granules.

The composition has the particle size of less than 10 microns and granule size of less than 2 mm. The composition has a dispersibility of 90%, suspensibility of 95% and wettability of less than 20 sec. The composition further demonstrated suspensibility of about 90% and dispersibility of about 86% under accelerated storage condition.

2. Water Dispersible Granular composition of 85% elemental Sulphur and 7% Azadirachtin.

The composition is prepared as per example 1 and comprises 85 parts of elemental Sulphur, 7 parts of Azadirachtin (95% purity), 4.6 parts of sodium lignosulfonate, 2.8 part of Agrilan700, and 0.6 parts of bentonite LT. The composition has the particle size of less than 15 microns and granule size of less than 2.5 mm. The composition has a dispersibility of 85%, suspensibility of 85% and wettability of less than 35 sec. The composition further demonstrated suspensibility of about 80% and dispersibility of about 81% under accelerated storage condition.

3. Water Dispersible granular composition of 90% elemental Sulphur and 0.5% Azadirachtin.

The composition is prepared as per example 1 and comprises 91 parts of elemental Sulphur, 0.53 parts of Azadirachtin (95% purity), 0.5 parts of butylatedhydroxytoulene, 7.95 part of Stepsperse DF 200, 0.02 part of Disodium EDTA. The composition has the particle size of less than 10 microns and granule size of less than 1.5 mm. The composition has a dispersibility of 90%, suspensibility of 85% and wettability of less than 30 sec. The composition further demonstrated suspensibility of about 80% and dispersibility of about 84% under accelerated storage condition.

4. Water Dispersible granular composition of 70% elemental Sulphur and 3% Azadirachtin.

The composition is prepared by spray drying process which comprises of 71 parts of elemental Sulphur, 3 parts of Azadirachtin (95% purity), 7 parts of naphthalene sulphonate condensate sodium salt, 6 part of china clay, 10 parts of Borresperse NA and 3 parts of sodium citrate. The composition has the particle size of less than 18 microns and granule size of less than 2.0 mm. The composition has a dispersibility of 75%, suspensibility of 80% and wettability of less than 40 sec. The composition further demonstrated suspensibility of about 75% and dispersibility of about 70% under accelerated storage condition.

5. Broadcast granular composition of 65% elemental Sulphur and 12% Azadirachtin.

The composition was prepared by blending 66 part of elemental Sulphur and 5 part of Reax 88A, 1 part of polyvinylpyrrolidone, 0.1 parts of silicone antifoam, 3.9 part of sodium citrate, 5 part of bentonite and 8 part of china clay to obtain a blend. The blend obtained was milled to get a powder of less than 50-micron particle size. Azadirachtin 12 (95% purity) is added to the milled mixture. The powder was mixed with water in a suitable mixing equipment to form a slurry. The slurry obtained was wet ground in suitable wet grinding equipment. The wet milled slurry obtained was spray dried at an inlet temperature less than 180° C. and outlet temperature less than 85° C. to get a granular powder with less moisture. The spray dried powder thus obtained was subjected to agglomeration in a fluid bed dryer, followed by a pin agglomerator and a pan granulator. The speed of the pan granulator was kept at around 35 rpm, to obtain the broadcast composition. Water was incorporated at the time of agglomeration. The granules obtained were then further dried in a post fluid bed drier to remove residual moisture, at a temperature around 70° C.

The composition has a granule size of about 4-5 mm, particle size range of about 25-35 microns. The granular composition has wettability of less than 120 second, suspensibility of 40% and dispersibility of 38. The composition further demonstrated dispersibility of 35% and suspensibility of about 38% under accelerated storage condition.

6. Broadcast granular composition of 70% elemental Sulphur and 10% Azadirachtin.

The granular composition is prepared as per example 5 which comprises 71 parts of elemental Sulphur, 10 part of Azadirachtin, 9 part of ufoxane 3A, 2 parts of hydroxypropylmethylcellulose, 2 parts of lactose, 2 parts of bentonite and 4 parts of china clay. The sample has a granule size of about 4.5-5.5 mm, particle size range of about 30-35 microns. The granular composition has wettability of less than 90 second, suspensibility of 50% and dispersibility of 45%. The composition further demonstrated dispersibility of 41% and suspensibility of about 45% under accelerated storage condition.

7. Wettable powder composition of 80% elemental Sulphur and 2% Azadirachtin.

Wettable powder is prepared by mixing 81 parts of elemental Sulphur, 2 parts of Azadirachtin, 11 parts of Geropon SC213, 1 part of sodium lauryl sulfate and 5 parts of bentonite. The obtained mixture is passed through jet mill to get particles with size of less than 7.0 microns. To the milled mixture 8 parts of Azadirachtin (purity 25%) is added to obtain a wettable powder. The powder has suspensibility of 77%, wettability of 15 seconds and wet sieve retention value of 0.2%. The composition has suspensibility of about 72% under accelerated storage condition.

8. Wettable powder composition of 65% elemental Sulphur and 15% Azadirachtin.

The wettable powder composition is prepared as per example 7 which comprises 66 parts of elemental Sulphur, 15 parts of Azadirachtin, 6 parts of Supragil MNS, 6 parts of phenol naphthalane sulphonate condensate sodium salt, 2 parts of Morwet EFW and 5 parts of china clay. The powder has particle size of less than 6.5 microns, suspensibility of 72% and wettability of 15 seconds and wet sieve retention value of 0.1%. The composition has suspensibility of about 65% under accelerated storage condition.

9. Dusting powder composition of 95% elemental Sulphur and 1% Azadirachtin.

Elemental Sulphur 96 parts, Azadirachtin 1 part, Soapstone 3 parts were mixed in a plough mixer and air jet milled to obtain a Dusting powder. The dusting powder has a particle size of less than 22 microns, percentage retained on dry sieve of 75 microns was 3.57%.

B. PHYSICAL PROPERTY DATA

Experiment 1

The water dispersible granular compositions comprising of 80% elemental Sulphur and 0.5% Azadirachtin were prepared at different particle sizes and the suspensibility of the composition at room temperature and at accelerated storage condition were tested and reported in table 1.

TABLE 1

Effect of particle sizes of water dispersible granular composition of 80% elemental Sulphur and 0.5% Azadirachtin on suspensibility of the composition at room temperature and on accelerated storage.

| S. No. | Details of the compositions with Particle size | Suspensibility | Suspensibility on accelerated storage |
|---|---|---|---|
| 1 | WG composition with 80% Elemental Sulphur and 0.5% Azadirachtin with 0.1-20 microns as per the embodiment of the present invention | 85% | 80% |
| 2 | WG composition with 80% Elemental Sulphur and 0.5% Azadirachtin with 0.1-60 microns as per the embodiment of the present invention | 60% | 55% |
| 3 | WG composition with 80% Elemental Sulphur and 0.5% Azadirachtin with 65-150 microns | 25% | 20% |

From the data presented in Table 1, it can be concluded that particle size of the water dispersible granular composition affects the suspensibility of the composition at room temperature and also on accelerated storage. The WDG sample in the size range of about 0.1 micron-60 microns has suspensibility of about 60% and is also stable on accelerated storage having suspensibility of about 55% whereas sample with larger particle size range of 65-150 microns demonstrate suspensibility of only 17% which on accelerated storage was found to be further decreased to 9%.

It is noted that the composition of the present invention with particles in size range of 0.1 micron to 60 microns demonstrates better suspensibility and is stable. It was further observed that the composition of present invention does not settle at the bottom of the container prior to application to the crops and hence accurate dose of actives is delivered to the crops or plants when applied on fields without hampering efficacy of the composition. On the contrary, it was observed that the composition with particle size greater than 60 microns demonstrate poor suspensibility which tend to settle at the bottom of container while hampering its application to crops and hence affecting efficacy of the composition. It was thus observed that the composition of Azadirachtin and elemental Sulphur with particles of the composition in size range of 0.1 micron to 60 microns as per embodiment of the present invention is stable, dispersible, suspensible and efficacious when applied to crop.

Experiment 2

Stability study of composition comprising of elemental Sulphur and Azadirachtin in water dispersible granular form vis-à-vis composition comprising of elemental Sulphur and Azadirachtin in aqueous liquid form at room temperature and also on accelerated storage.

The water dispersible granular composition comprising of 80% elemental Sulphur and 0.65% Azadirachtin was prepared and compared with liquid composition comprising of 40% elemental Sulphur and 0.4% Azadirachtin to determine stability at room temperature (RT) and on accelerated storage condition (ATS). The amount of Azadirachtin retained at room temperature and at accelerated storage condition was tested and reported in table 2.

TABLE 2

| S. No. | Details of the compositions | Amount of Azadirachtin A at RT (%) | Amount of Azadirachtin A on accelerated storage (%) |
|---|---|---|---|
| 1 | Elemental Sulphur 80% + Azadirachtin 0.65% Water Dispersible Granule | 0.65 | 0.63 |
| 2 | Elemental Sulphur 40% + Azadirachtin 0.4% Aqueous liquid composition | 0.1 | 0.00 |

From the data presented in Table 2, it was observed that the composition of elemental Sulphur and Azadirachtin in the form of water dispersible granule as per embodiment of the present invention is stable on storage as compared to the composition of elemental Sulphur and Azadirachtin in aqueous liquid form. The WDG composition comprised of 0.65% of Azadirachtin A and when such composition was kept for stability, it was observed that 0.65% and 0.63% of Azadirachtin A was retained at RT and on accelerated storage respectively out of the total amount of Azadirachtin A present in the composition whereas the aqueous liquid composition which comprised of 0.4% of Azadirachtin A when subjected to stability studies, it was observed that only 0.1% was retained at RT while no Azadirachtin A was found on accelerated storage in said composition.

It is thus noted that Azadirachtin gets degraded and is unavailable when formulated in a composition comprising of elemental sulphur and Azadirachtin in aqueous liquid form whereas it was surprisingly observed that Azadirachtin remains stable when formulated in solid dosage form such as water dispersible granules of the present invention, even on accelerated storage, and thus adequate dose of Azadirachtin is delivered to the crops or plants when applied on fields without hampering efficacy of the composition. It was thus observed that the composition of Azadirachtin and elemental Sulphur in solid dosage form with particles of the composition in size range of 0.1 micron to 60 microns as per embodiment of the present invention is stable and efficacious when applied to crop.

C. FIELD STUDIES

Trial 1: To study the efficacy of water dispersible granules of elemental Sulphur and Azadirachtin on Tea mites (Red spider mites):

Field trial was conducted for the evaluation of an embodiment of the composition of the present invention at Kharibari, Darjeeling, West Bengal on Tea crop. The trials were laid down in Randomized Block Design (RBD) with seven treatments including untreated control, replicated four times. For each treatment, plot size of 35 sq·m (7m×5m) was maintained. The composition of elemental Sulphur and Azadirachtin in various formulation types such as extruded WDG, WDG and WP, sulphur WDG and Neemazal 1% liquid composition (Azadirachtin) at prescribed dose were applied as foliar spray on tea crop. The details of the experiment are as follows:

a) Trial Location: Kharibari, Darjeeling, WB
b) Crop: Tea
c) Experiment season: Rabi 2021-22
d) Trial Design: Randomized Block Design
e) Replications: Four
f) Treatment: Seven
g) Plot size: 7m×5m=35 sq·m
h) Date of Application: 8 Apr. 2022
i) Age of crop: 10 years
j) Method of application: Foliar The observations were recorded at 1DAA, 3DAA, 5DAA, 7DAA, 14DAA and 21DAA and the mean data was presented in Table 1 to enumerate the efficacy of the water dispersible granular composition of elemental Sulphur and Azadirachtin.

TABLE 1

| Treatments | G/a.i of Sulphur | G/a.i of Azadirachtin | Formulation dosage (gm/ha) | RSM count Mean value/9 Leaf of tea | | | | | |
|---|---|---|---|---|---|---|---|---|---|
| | | | | 1DAA | 3DAA | 5DAA | 7DAA | 14DAA | 21DAA |
| T1: Elemental Sulphur 80% + Azadirachtin 0.5% extruded Water Dispersible | 800 | 5 | 1000 | 2.1 | 1.5 | 1.4 | 1.8 | 2.1 | 1.1 |

TABLE 1-continued

| | | | | | | | | |
|---|---|---|---|---|---|---|---|---|
| Granule as per embodiment of the present invention | | | | | | | | |
| T2: Elemental Sulphur 65% + Azadirachtin 0.4% Water Dispersible Granule prepared as per embodiment of the present invention | 800 | 5 | 1232 | 1.9 | 1.2 | 1.3 | 1.5 | 1.4 | 1.3 |
| T3: Elemental Sulphur 90% + Azadirachtin 0.6% Wettable powder prepared as per embodiment of the present invention | 800 | 5 | 889 | 1.8 | 1.3 | 1.4 | 1.6 | 1.9 | 1.5 |
| T4: Neemazal 1% liquid composition | 0 | 5 | 500 | 4.3 | 4.7 | 6.8 | 8.1 | 9.7 | 10.3 |
| T5: Sulphur 80%WDG | 800 | | 1000 | 3.9 | 4.0 | 5.1 | 6.3 | 6.7 | 6.4 |
| T6: Sulphur 60% + Azadirachtin 0.4% Liquid composition | 800 | 5 | 1334 | 3.9 | 4.5 | 5 | 5.8 | 6.1 | 6.1 |
| T7: Untreated control | | | NA | 6.7 | 8 | 9.7 | 11.6 | 12.3 | 12.6 |

DAA- Days after application; RSM- Red Spider Mites

Table 1 continued:

| Treatment numbers | % Reduction of RSM over UTC | | | | | | Expected Reduction of RSM (%) as per |
|---|---|---|---|---|---|---|---|
| | 1DAA | 3DAA | 5DAA | 7DAA | 14DAA | 21DAA | colby after 21DAA |
| T1: Elemental Sulphur 80% + Azadirachtin 0.5% Extruded Water Dispersible Granule as per embodiment of the present invention | 68.5 | 81.3 | 85.5 | 84.4 | 83 | 91.2 | 58.45% |
| T2: Elemental Sulphur 65% + Azadirachtin 0.4% Water Dispersible Granule as per embodiment of the present invention | 71.5 | 85 | 86.6 | 87 | 88.6 | 89.68 | |
| T3: Elemental Sulphur 90% + Azadirachtin 0.6% Wettable powder prepared as per embodiment of the present invention | 73.13 | 83.75 | 85.5 | 86.2 | 84.5 | 88.09 | |
| T4: Neemazal 1% liquid composition | 35 | 41.7 | 29.9 | 29.8 | 21.6 | 18.2 | |
| T5: Sulphur 80%WDG | 41.7 | 50 | 47.4 | 45.6 | 45.5 | 49.2 | |

TABLE 1-continued

| | | | | | | |
|---|---|---|---|---|---|---|
| T6: Sulphur 60% + Azadirachtin 0.4% liquid composition | 41.7 | 43.75 | 48.4 | 50 | 50.4 | 51.5 |
| T7: Untreated control | | | | | | |

Synergy" is as defined by Colby S. R. in an article entitled "Calculation of the synergistic and antagonistic responses of herbicide combinations" published in Weeds, 1967, 15, p. 20-22.
The action expected for a given combination of two active components can be calculated as follows:
$E = X + Y - (XY/100$ Where,
$E$ = Expected % effect by mixture of two products X and Y in a defined dose.
$X$ = Observed % effect by product A
$Y$ = Observed % effect by product B
The synergy factor (SF) is calculated by Abbott's formula (Eq.(2)(Abbott, 1925).
$SF$ = Observed effect /Expected effect
Where, $SF > 1$ for Synergistic reaction; $SF < 1$ for antagonistic reaction; $SF = 1$ for additive reaction.

It can be observed that after 21DAA, the synergy factor is 1.56, 1.53 and 1.50 for treatments T1, T2 and T3 as seen from Table 1 which depicts that the composition of elemental Sulphur and Azadirachtin in various formulation types is synergistic in nature. This synergistic behaviour of elemental Sulphur+Azadirachtin in the form of WDG, extruded WDG and WP as per embodiment of the present invention was observed from the percent reduction in Red spider mites on tea crop. The treatments namely T1 (Sulphur 80%+ Azadirachtin 0.5% Extruded Water Dispersible Granule), T2 (Sulphur 65%+Azadirachtin 0.4% Water Dispersible Granule) and T3 (Elemental Sulphur 90%+Azadirachtin 0.6% Wettable powder) prepared as per embodiment of the present invention were applied at same active dosage as compared to individual actives i.e. 800 gm/acre of sulphur and 5 gm/acre of Azadirachtin and demonstrated best control over red spider mites of about 91.2%, 89.68% and 88.09% respectively whereas treatment T4 (Neemazal 1% Liquid composition) and T5 (Sulphur 80% WDG) demonstrated mites control of only 18.2% and 49.2% respectively. Also, treatments T1, T2 and T3 depicted a better control over mites in tea as compared to application of treatment T5 (Sulphur 60%+Azadirachtin 0.4% Liquid composition). Thus, the combination of elemental Sulphur and Azadirachtin in various formulation types prepared as per embodiment of the present invention is synergistic and provides better crop protection as compared to individual application of elemental Sulphur and Azadirachtin. The synergistic effect of the composition of the present invention was observed over the entire claimed concentration range of the actives and over the various formulation types as claimed in the present invention.

Experiment 2: To Study the Efficacy of Water Dispersible Granules of Elemental Sulphur and Azadirachtin on Brinjal Jassids The field trials were carried out to observe the effect of different formulation of elemental Sulphur and Azadirachtin on crop pest and also to determine effect on yield of commercially cultivated Brinjal field at Gujarat.

The trial was laid out during Rabi season in Randomized Block Design (RBD) with six treatments including untreated control, replicated thrice. For each treatment, plot size of 35 sq·m (7m×5m) was maintained. The Brinjal crop in trial field was raised followed good agricultural practice. The experimental details are as mentioned below:

Details of Experiment a) Trial Location: Himatnagar, Gujarat
b) Crop: Brinjal
c) Experiment season: Rabi 2021-22
d) Trial Design: Randomized Block Design
e) Replications: three
f) Treatment: six
g) Plot size: 7m×5m=35 sq·m
h) R×P spacing: 30 cm×15 cm
h) Date of sowing: 15 Dec. 2021
i) Date of Application: 22 Jan. 2022
j) Method of application: Foliar Spray
k) Date of Harvesting: 11 Mar. 2022

The observations on different parameters of yield were recorded at the harvesting time and mean data were presented in Table 2 to enumerate the impact of different formulation of composition of elemental Sulphur and Azadirachtin. The efficacy of the composition was also demonstrated on Jassid attack of brinjal crop.

TABLE 2

| Treatment numbers | Formulation gm/ha | Jassid count Mean value/9 Leaf of Brinjal | | | | | |
|---|---|---|---|---|---|---|---|
| | | 1DAA | 3DAA | 5DAA | 7DAA | 14DAA | 7DAA2 Spray |
| T1: Elemental Sulphur 65% + Azadirachtin 1.5% WDG as per embodiment of the present invention | 1309 | 1.5 | 1.2 | 1 | 1.8 | 1.4 | 2.3 |

TABLE 2-continued

| | | | | | | | |
|---|---|---|---|---|---|---|---|
| T2: Elemental Sulphur 90% + Azadirachtin 0.05% extruded WDG as per embodiment of the present invention | 894 | 2.3 | 1.2 | 2.1 | 2.2 | 2.4 | 2.1 |
| T3: Elemental Sulphur 65% + Azadirachtin 15% WP as per embodiment of the present invention | 1073 | 1.2 | 1.3 | 1.4 | 2.1 | 2.5 | 2.5 |
| T4: Elemental Sulphur 85% + Azadirachtin 7%WDG as per embodiment of the present invention | 875 | 2.1 | 2 | 1.7 | 1.2 | 2.1 | 2.4 |
| T5: Elemental Sulphur 65% + Azadirachtin 5% WDG as per embodiment of the present invention | 1150 | 2.5 | 1.6 | 1.4 | 2.1 | 1.7 | 2.9 |
| T6: Untreated control | NA | 6.7 | 8 | 9.7 | 11.6 | 12.3 | 12.6 |

Table 2 continued.

| Treatment | % Reduction of Jassid over UTC | | | | | | Yield data |
|---|---|---|---|---|---|---|---|
| numbers | 1DAA | 3DAA | 5DAA | 7DAA | 14DAA | 7DAA2 spray | (kg/ha) |
| T1: Elemental Sulphur 65% + Azadirachtin 1.5% WDG as per embodiment of the present invention | 77.5 | 85 | 89.7 | 84.4 | 88.6 | 81.7 | 24600 |
| T2: Elemental Sulphur 90% + Azadirachtin 0.05% WDG as per embodiment of the present invention | 65.5 | 85 | 78.3 | 81 | 80.5 | 83.3 | 25700 |
| T3: Elemental Sulphur 65% + Azadirachtin 15% WP as per embodiment of the present invention | 82 | 83.8 | 85.5 | 81.8 | 79.7 | 80.5 | 23800 |
| T4: Elemental Sulphur 85% + Azadirachtin 7%WDG as per embodiment of the present invention | 68.5 | 75 | 82.4 | 89.6 | 83 | 80.95 | 25400 |
| T5: Elemental Sulphur 65% + Azadirachtin 5% WDG as per embodiment of the present invention | 62.5 | 80 | 85.5 | 81.8 | 86.2 | 76.9 | 24500 |

TABLE 2-continued

| | |
|---|---|
| T6: Untreated control | 19200 |

WDG—Water dispersible granule; WP-Wettable powder;
DAA—Days after application

It can be appreciated from the observed results presented in Table 2 that the composition of elemental Sulphur+ Azadirachtin in the form of a water dispersible granules and wettable powder as per embodiment of the present invention at different concentrations exhibits significantly good results as compared to the untreated plot.

From Table 2, it can be observed that % reduction in jassids after 7DAA2 spray with T1 and T2 was about 81.7% and 83.3% respectively. Similarly, treatments T3-T5 also depicted better control over jassids in brinjal over untreated plot.

Furthermore, it was observed from treatments T1-T5 prepared according to an embodiment of the present invention that the said treatments demonstrated better yield as compared to the untreated plot. For instance, treatments T1 and T2 depicted yield of about 24600 kg/ha and 25700 Kg/ha. Similar effects were observed with other treatments T3, T4 and T5 as compared to untreated. Thus, it can be concluded that the combination of elemental Sulphur and Azadirachtin (treatments T1-T5) in various formulation types as per the embodiment of the present invention shows significant improvement in yield. Thus, it was observed that the bio-pesticidal combination of the present invention is efficacious not only over various pests but also resulting in higher yield on account of effective pest control.

Experiment 3: To assess the impact of particle size of the composition of elemental Sulphur (E.S)+Azadirachtin on control of leaf minor and yield of Tomato at Nasik, Maharashtra.

Field Experiment Methodology

The trial was laid out during rabi season in Randomized Black Design (RBD) with four treatments including untreated control, replicated four times. For each treatment, plot size of 40 sq·m (8m×5m) was maintained. The compositions tried included elemental Sulphur 80% and 0.5% Azadirachtin water dispersible granules in varying particle size range. The tomato crop in trial field was raised following good agricultural practice.

Details of Experiment a) Trial Location: Nasik, Maharashtra b) Crop: Tomato c) Experiment season: Rabi 2021-22 (November to March)

d) Trial Design: Randomized Block Design e) Replications: Four f) Treatment: 4 g) Plot size: 8m×5m=40 sq·m h) Date of sowing: 10 Nov. 2021 i) Date of Application: 30 Nov. 2021 j) Method of application: Foliar application k) Date of Harvesting: 12 Dec. 2021

The observations on tomato fruit yield and pest control were recorded and mean data was presented in table 3 to see the impact of particle size of the composition on the yield and pest control (leaf minor) of Tomato. Data was collected from five plants in the middle of each plot and the averages per plant were computed for damage caused by pest. Leaf damage was assessed as the percentage of leaves affected (mined) by *T. absoluta*.

TABLE 3

| Treatment details | Range of particle size of composition | Dose of active ingredient in g/hectare | | % pest control | yield (qtl/ hectare) |
|---|---|---|---|---|---|
| | | Sulphur | Azadirachtin | | |
| T1-Untreated | — | — | — | — | 9.07 |
| T2- Elemental Sulphur 80% + Azadirachtin 0.5% water dispersible granules as per embodiment of the invention | 0.1 to 20 microns | 800 | 5 | 80 | 12.08 |
| T3- Elemental Sulphur 80% + Azadirachtin 0.5% water dispersible granules as per embodiment of the invention | 0.1 to 60 microns | 800 | 5 | 78 | 12.01 |
| T4 Elemental Sulphur 80% + Azadirachtin 0.5% water dispersible granules | 60 to 100 microns | 800 | 5 | 38 | 10.2 |

It can be seen from the data presented in Table 3 that Treatment T2 with Elemental Sulphur 80%+Azadirachtin 0.5% water dispersible granules as per embodiment of the invention with particle size in the range of 0.1 micron to 20 microns and Treatment T3 with Elemental Sulphur 80%+ Azadirachtin 0.5% water dispersible granules as per embodiment of the invention with particle size in the range of 0.1 micron to 60 microns showed a significant increase in the yield when compared to treatment T4 of Elemental Sulphur 80%+Azadirachtin 0.5% water dispersible granules having particle size in the range of 60 to 100 microns. It was observed that the Treatment T2 and T3 with composition as per the present invention showed a surprisingly significant control over leaf minor disease on tomato leaves wherein the control was about 80% and 78% respectively whereas the treatments T4 only showed disease control of 38%, as compared to the untreated control. Furthermore, it was observed that the fruit yield was the best with application of treatment T2 and T3 prepared as per embodiment of the present invention as compared to treatment T4 and untreated plot. It was hence noted that better yield and pest control was observed with the water dispersible granular formulation, as per the present invention, where the composition comprised particles in the size range of 0.1-60 microns, as compared to the water dispersible granular formulation with higher particle size range.

Experiment 4: To Assess the Efficacy of the Composition of Elemental Sulphur (E.S)+Azadirachtin on Aphids in Okra Field Experiment Methodology The trial was laid out during Kharif season in Randomized Black Design (RBD) with four treatments including untreated control, replicated four times. For each treatment, plot size of 40 sq·m (8m×5m) was maintained. The compositions tried included elemental Sulphur 80% and 0.5% Azadirachtin water dispersible granules, Thiamethoxam 25% WDG (Actara) and untreated control. The Okra crop in trial field was raised following good agricultural practice.

Details of Experiment a) Trial Location: Nasik, Maharashtra (Adgaon)
b) Crop: Okra (Kumkum, Advanta seeds)
c) Experiment season: Kharif 2021-22
d) Trial Design: Randomized Block Design
e) Replications: Four
f) Treatment: 4
g) Plot size: 8m×5m=40 sq·m
i) Date of Application: First: 8 Apr. 2021
   Second: 18 Apr. 2021
j) Method of application: Foliar application
The observations on pest control were recorded at 0, 1, 3, 7 and 10 Days after first and second spray and mean data was presented in table 4 to see the impact of the composition on pest control (Aphids) of Okra as compared to synthetic pesticides.

TABLE 4

| TREATMENT DETAILS | Formulation dose gm/ha | 0DAA1 Spray | 1DAA1 Spray | 3DAA1 Spray | 7DAA1 Spray | 10DAA1 Spray | 1DAA2 Spray | 3DAA2 Spray | 7DAA2 Spray | 10DAA2 Spray | Mean | % Aphid reduction untreated |
|---|---|---|---|---|---|---|---|---|---|---|---|---|
| T1: Elemental Sulphur 80% + Azadirachtin 0.5% water dispersible granules as per embodiment of the present invention | 2482 | 0.1 | 0.07 | 0.3 | 4.5 | 3.74 | 4.56 | 5.7 | 8.2 | 12.33 | 4.4 | 81.5 |
| T2: Elemental Sulphur 80% + Azadirachtin 0.5% water dispersible granules as per embodiment of the present invention | 4969 | 0 | 0 | 0 | 2.9 | 3.41 | 7.19 | 6.2 | 6.3 | 10.07 | 4.02 | 83.1 |
| T3: Thiamethoxam 25% WDG (Actara) commercially available | 100 | 0.3 | 0.07 | 0 | 4.5 | 7.01 | 7.5 | 6.5 | 5.5 | 4.1 | 4.7 | 80.2% |
| T4: Untreated control | | 0.3 | 0.19 | 1.1 | 25 | 11.5 | 19.7 | 20 | 69 | 67.79 | 23.8 | |

It can be seen from the data presented in Table 4 that Treatments T1 and T2 with Elemental Sulphur 80%+Azadirachtin 0.5% water dispersible granules as per embodiment of the invention with different dosage showed a significant control over Aphids. It was observed that Treatment T1 and T2 with composition as per embodiment the present invention showed a surprisingly significant control over Aphid on Okra over the control and was noted to be about 81.5% and 83.1% respectively. For treatment T3, with Thiamethoxam 25% WDG (Actara), a pest control of 80.2% over the untreated control was noted. It may be noted that the control of aphids with the claimed composition is marginally better or at par when compared to treatment T3 d) Trial Design: Randomized Block Design
e) Replications: Five
f) Treatment: 4
g) Plot size: 3 grape vine per treatment/replication
h) Date of application: 15 Nov. 2021 (1st application)
25 Nov. 2021 (2nd application)
h) Method of Application: Foliar spray (2 sprays)

The observations on disease control were recorded at 0, 10 Days after first and 10 Days after second spray and Percent Disease Index (PDI) was presented in table 5 to see the impact of the composition on disease control (Powdery Mildew) of Grapes as compared to synthetic pesticides.

| | Formulation | | | Percent Disease Index (PDI) (Powdery mildew) | | | |
|---|---|---|---|---|---|---|---|
| Treatment Details | Dosage (gm/ml/ha) | Dose (gm/ml/lit) | 0 days | 10 days after 1st Spray | 10 days after 2nd Spray | Crop Phytotoxicity |
| T1: Sulphur 80% + Azadirachtin 0.04% WG as per an embodiment of the invention | 30000 | 60 | 10 | 15.3 | 1 | 0 |
| T2: Sulphur 80% WG | 30000 | 60 | 10 | 14 | 2.3 | 0 |
| T3: Fluopyram 17.7% + Tebuconazole 17.7% SC commercially available product | 1500 | 3 | 10 | 13 | 1 | 0 |
| T4: Untreated check | NA | Water spray only | 20.3 | 51 | 70.7 | 0 | of Thiamethoxam 25% WDG (Actara) composition. It was hence noted that an effective pest control was observed with the use bio-pesticidal composition formulated as per embodiments of the present invention wherein the composition exhibited at par efficacy as that of the commercially available synthetic formulation. Thus, the study concludes that composition of Elemental Sulphur 80%+Azadirachtin 0.5% as per embodiment of the invention can be employed as an alternative pest management solution for treatment of sucking pests and obviates the need for the use of synthetic pesticides.

Experiment 5: To Assess the Efficacy of the Composition of Elemental Sulphur (E.S)+Azadirachtin on Powdery Mildew in Grapes Field Experiment Methodology The trial was laid out during Kharif season in Randomized Black Design (RBD) with four treatments including untreated control, replicated five times. For each treatment, plot size as required was maintained. The compositions tried included elemental Sulphur 80% and 0.4% Azadirachtin water dispersible granules, sulphur 80% WDG, commercially available SC product of Fluopyram 17.7%+Tebuconazole 17.7% and untreated control. The crop in trial field was raised following good agricultural practice.

Details of Experiment a) Trial Location: Nasik, Maharashtra
b) Crop: Grapes
c) Experiment season: Kharif 2021-2022

It can be observed from the data presented in Table 5 that Treatment T1 with Elemental Sulphur 80%+Azadirachtin 0.4% water dispersible granules as per embodiment of the invention showed a significant control over powdery mildew when compared to treatment T3 of Fluopyram 17.7%+Tebuconazole 17.7% SC composition. It was observed that the Treatment T1 with composition as per the present invention was highly effective in reducing Powdery mildew disease in okra with lowest PDI which shows at par efficacy as that of the commercially available synthetic formulation and found better than untreated check. It was surprising to observe that the composition of the present invention was able to control powdery to the fullest extent, at par with other synthetic crop protection agents, and also without the need for synthetic crop protection agents.

The inventors of the present invention have further observed that the composition of the present invention comprising elemental Sulphur and Azadirachtin with an agrochemical excipient, helps to reduce degradation of Azadirachtin by modulating the pH of the composition and thus maintain stability of Azadirachtin in the formulation and demonstrated effective control of pest or diseases in the field and higher crop yield.

Thus, it has been observed that the compositions of the present invention demonstrated an alternative and effective means of controlling pests and also provide nutrition to the plants over that of synthetic chemical pesticides and fertilizers. In fact, various advantageous properties associated with the bio-pesticidal composition which include but are not limited to stability, improved toxicological and/or eco-toxicological behaviour, improved crop characteristics including crop yields, crop characteristic such more developed root system, increase in crop height, bigger leaf blade, less dead basal leaves, stronger tillers, greener leaf color, less fertilizers needed, tillering increase, increased shoot growth, improved plant or crop vigor, earlier flowering, more productive tillers, less plant verse (lodging), improved chlorophyll content of the leaves, photosynthetic activity, improved quality of the produce, better crop protection, disease resistance and other advantages familiar to a person skilled in the art.

From the foregoing, it will be observed that numerous modifications and variations can be effectuated without departing from the true spirit and scope of the novel concepts of the present invention. It is to be understood that no limitation with respect to the specific embodiments illustrated is intended or should be inferred.

We claim:

1. A solid bio-pesticidal composition comprising:
    elemental sulphur in a range of 60% w/w to 99% w/w of a total composition,
    Azadirachtin in a range of 0.05% w/w to 20% w/w of the total composition, and
    at least one agrochemically acceptable excipient,
        wherein the solid bio-pesticidal composition is in a form of water dispersible granules, broadcast granules, extruded granules, spheronised granules, or powder;
        wherein the solid bio-pesticidal composition comprises particles in a size range from 0.1 micron to 60 microns; and
        wherein the elemental sulphur and the azadirachtin are synergistic.

2. The solid bio-pesticidal composition of claim 1, wherein the solid bio-pesticidal composition comprises particles in a size range of from 0.1 micron to 20 microns.

3. The solid bio-pesticidal composition of claim 1, wherein granules are in a size range of from 0.05 mm to 6 mm.

4. The solid bio-pesticidal composition of claim 1, wherein granules are in the size range of from 0.05 mm to 2.5 mm.

5. The solid bio-pesticidal composition of claim 1, wherein the at least one agrochemical acceptable excipient is selected from at least one of surfactants, binders or binding agents, wetting agent, emulsifiers, disintegrating agents, fillers or carriers or diluents, coating agents, buffers or pH adjusters or neutralizing agents, antifoaming agents or defoamers, chelating or complexing or sequestering agents, suspending agents or suspension aid agents or anticaking agents or anti-settling agents, tackifier, sticking agents, UV agents, or mixtures thereof.

6. The solid bio-pesticidal composition of claim 5, wherein the solid bio-pesticidal composition comprises at least one of surfactant or carrier or binder.

7. The solid bio-pesticidal composition of claim 1, wherein suspensibility is at least 30%.

8. The solid bio-pesticidal composition of claim 1, wherein suspensibility is at least 30% under accelerated storage condition.

9. The solid bio-pesticidal composition of claim 1, wherein an Azadirachtin content under accelerated storage is not less than 50% relative to an Azadirachtin active content at room temperature.

10. The solid bio-pesticidal composition of claim 9, wherein an Azadirachtin content under accelerated storage is not less than 75% relative to an Azadirachtin active content at room temperature.

11. A process for preparation of the solid bio-pesticidal composition of claim 1 in the form of the powder, the process comprising:
    mixing and milling the elemental sulphur and the at least one agrochemically acceptable excipient; and
    adding the Azadirachtin to a dry mixture to obtain the powder.

12. A process for preparation of the solid bio-pesticidal composition of claim 1 in the form of the water dispersible granules, the process comprising:
    milling the elemental sulphur and the at least one agrochemically acceptable excipient to obtain a slurry or a wet mix;
    adding the Azadirachtin to the slurry or to the wet mix;
    mixing the slurry or the wet mix; and
    drying the slurry or the wet mix to obtain the water dispersible granules, wherein the water dispersible granules are in a range of 0.05 mm to 2.5 mm.

13. A process for preparation of the solid bio-pesticidal composition of claim 1 in the form of the extruded granules or the form of the broadcast granules, the process comprising:
    milling the elemental sulphur and the at least one agrochemically acceptable excipient to obtain a slurry or a wet mix;
    adding the Azadirachtin to milled material and drying in suitable drying equipment;
    agglomerating powder or fine granules by adding at least one filler or carrier to obtain granules of a size of about 0.05 mm to 6 mm; or
    granulating a dry mass of the blend of elemental sulphur and the Azadirachtin by adding a suitable quantity of water to prepare a wet mass and extruding the wet mass through a suitable extruder to obtain the extruded granules of size 0.05 mm to 6 mm.

14. A method for treatment of plant, crop, locus or soil against pests or diseases or managing pesticidal resistance or reducing pesticidal residue, comprising application of the solid bio-pesticidal composition of claim 1.

15. The method for treatment of claim 14, wherein the solid bio-pesticidal composition is effective against sucking pests, powdery mildew, and mites.

16. The method for treatment of claim 14, wherein the solid bio-pesticidal composition is applied at a dosage of 0.5 kg/ha to 30 kg/ha.

17. A method for controlling pests and diseases, wherein the method comprises applying the solid bio-pesticidal composition of claim 1 by foliar means at a dosage of 0.5 kg/ha to 30 kg/ha to a plant or a crop or parts thereof.

18. The method for controlling pests and diseases of claim 17, wherein the solid bio-pesticidal composition is effective against sucking pests, powdery mildew, and mites.

19. The method for controlling pests and diseases of claim 18, wherein the solid bio-pesticidal composition is effective against powdery mildew at the dosage of 0.5 kg/ha to 30 kg/ha.

20. The method for controlling pests and diseases of claim 18, wherein the solid bio-pesticidal composition is effective against sucking pests at a dosage of 0.5 kg/ha to 20 kg/ha.

21. The method for controlling pests and diseases of claim 18, wherein the solid bio-pesticidal composition is effective against mites at a dosage of 0.5 kg/ha to 10 kg/ha.

* * * * *